US009403403B2

(12) United States Patent
Chou et al.

(10) Patent No.: US 9,403,403 B2
(45) Date of Patent: Aug. 2, 2016

(54) MODULATION OF A CONFIGURABLE WHEEL COVER

(71) Applicants: Chiahua Eleanor Chou, Schaumburg, IL (US); Craig Massner, Naperville, IL (US)

(72) Inventors: Chiahua Eleanor Chou, Schaumburg, IL (US); Craig Massner, Naperville, IL (US)

( * ) Notice: Subject to any disclaimer, the term of this patent is extended or adjusted under 35 U.S.C. 154(b) by 289 days.

(21) Appl. No.: 13/936,618

(22) Filed: Jul. 8, 2013

(65) Prior Publication Data

US 2015/0008725 A1    Jan. 8, 2015

(51) Int. Cl.
B60B 7/04      (2006.01)
B60B 7/00      (2006.01)

(52) U.S. Cl.
CPC ............. B60B 7/04 (2013.01); B60B 7/0013 (2013.01); *B60B 2900/116* (2013.01); *B60B 2900/351* (2013.01); *Y10T 29/4954* (2015.01)

(58) Field of Classification Search
CPC ...... B60B 7/0013; B60B 7/04; B60B 7/0053; B60B 7/063; B60B 7/066
USPC ............. 301/37.43, 37.26, 37.107, 37.102, 301/37.106
See application file for complete search history.

(56) References Cited

U.S. PATENT DOCUMENTS

| | | | |
|---|---|---|---|
| 3,579,408 A * | 5/1971 | Dowhan | 301/37.39 |
| 5,707,113 A * | 1/1998 | Russell | 301/37.375 |
| 6,059,376 A * | 5/2000 | Shryock | 301/37.109 |
| 6,517,168 B1 * | 2/2003 | Van Houten | 301/37.42 |
| 6,585,330 B2 * | 7/2003 | Bruce | 301/37.372 |
| 6,978,544 B1 * | 12/2005 | Eikhoff et al. | 29/894.381 |
| 7,055,915 B2 * | 6/2006 | Fitzgerald | 301/37.106 |
| 7,269,917 B2 * | 9/2007 | Dempsey | 40/587 |
| 7,452,037 B1 * | 11/2008 | Nunes | 301/37.31 |
| 7,841,670 B2 * | 11/2010 | Takeda et al. | 301/37.102 |
| 8,201,894 B2 * | 6/2012 | Chinavare et al. | 301/37.28 |
| 8,382,211 B2 * | 2/2013 | Renius et al. | 301/37.102 |
| 8,579,382 B2 * | 11/2013 | Peschiutta | 301/37.107 |
| 8,864,242 B2 * | 10/2014 | Mengle et al. | 301/37.107 |
| 2003/0090143 A1 * | 5/2003 | Bruce | 301/108.4 |
| 2003/0155804 A1 * | 8/2003 | Weckman et al. | 301/37.28 |
| 2004/0195905 A1 * | 10/2004 | French et al. | 301/37.28 |
| 2006/0238017 A1 * | 10/2006 | Samson et al. | 301/37.101 |
| 2008/0265655 A1 * | 10/2008 | Doctor | 301/37.26 |
| 2010/0181821 A1 * | 7/2010 | Noriega | 301/5.1 |
| 2010/0194181 A1 * | 8/2010 | Noriega | 301/37.26 |
| 2010/0231029 A1 * | 9/2010 | Russell | 301/37.31 |
| 2011/0291465 A1 * | 12/2011 | Peschiutta et al. | 301/37.102 |
| 2014/0152079 A1 * | 6/2014 | Vickers et al. | 301/37.102 |
| 2014/0339887 A1 * | 11/2014 | Chen | 301/37.102 |
| 2015/0069821 A1 * | 3/2015 | Bennett et al. | 301/37.26 |

* cited by examiner

*Primary Examiner* — John Walters
*Assistant Examiner* — James Triggs
(74) *Attorney, Agent, or Firm* — WPAT, P.C., Intellectual Property Attorneys; Anthony King

(57) ABSTRACT

The present invention relates to a method for preparing a configurable wheel cover and to a product thereof. The method comprises: (a) providing a hub cover including a plurality of locking voids and a plurality of knobs; (b) providing an insert kit including a plurality of inserts, and a front end of each insert being connected with a tenon; and (c) configuring each tenon of the insert kit into each locking void from a top or a bottom of the hub cover. In addition, the present invention further provides a novel configurable wheel cover.

11 Claims, 12 Drawing Sheets

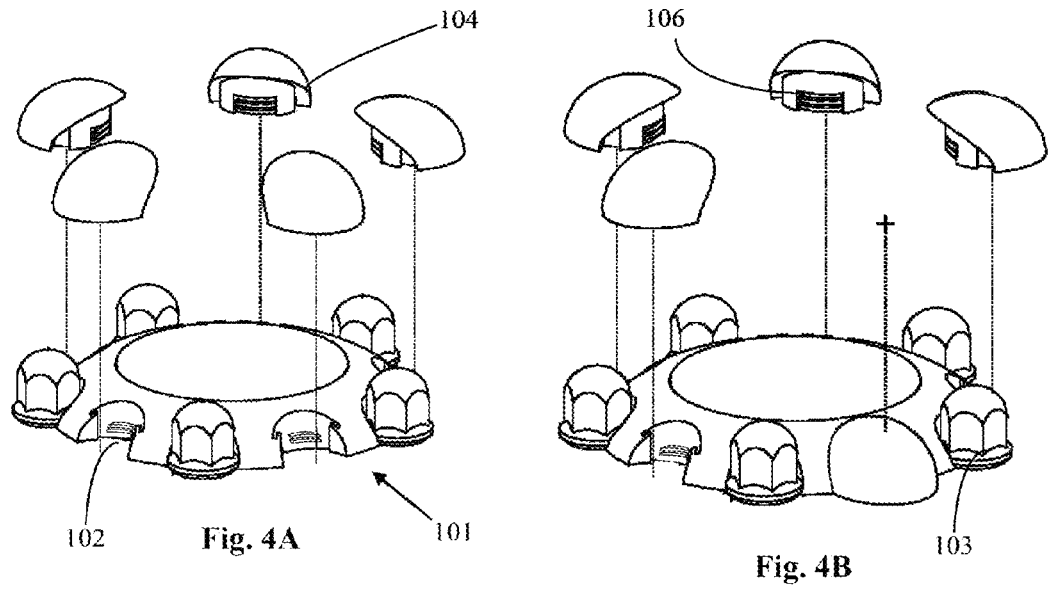
Fig. 4A
Fig. 4B
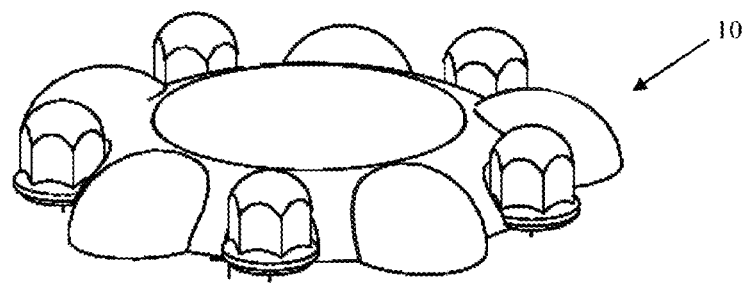
Fig.4C
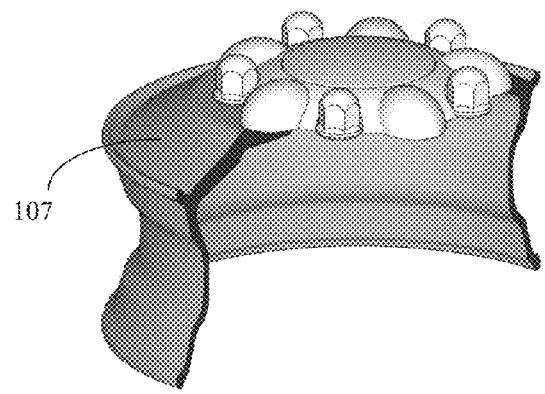
Fig. 4D

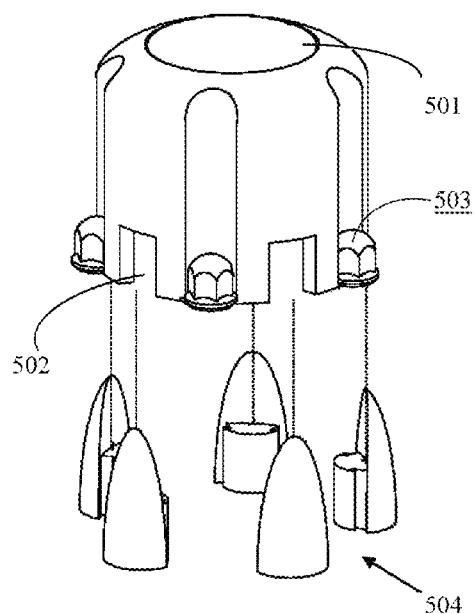
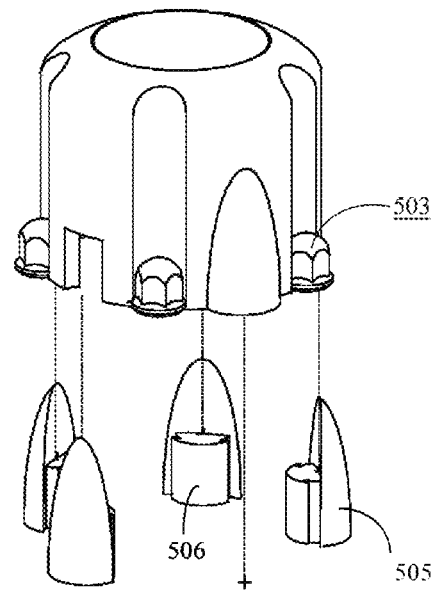
Fig. 5A  Fig. 5B
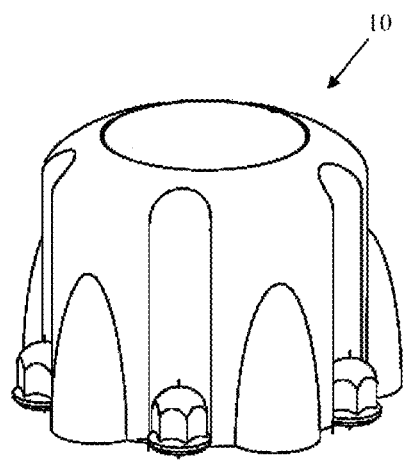
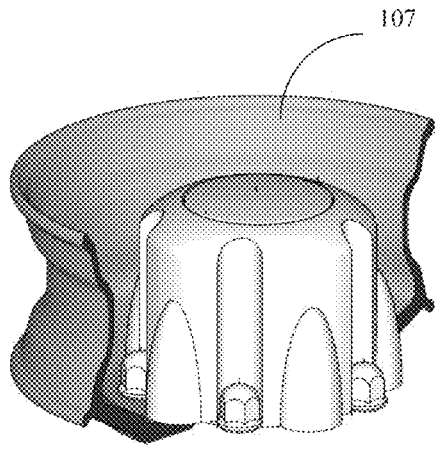
Fig. 5C  Fig. 5D

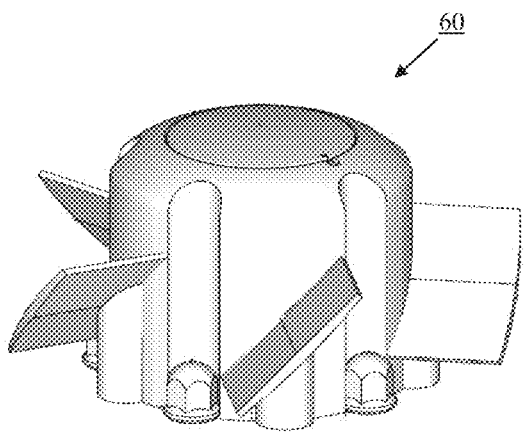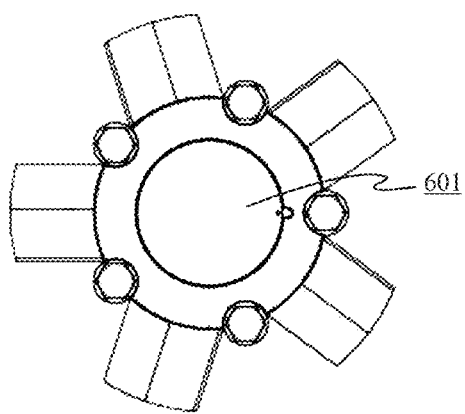
Fig. 6A          Fig. 6B
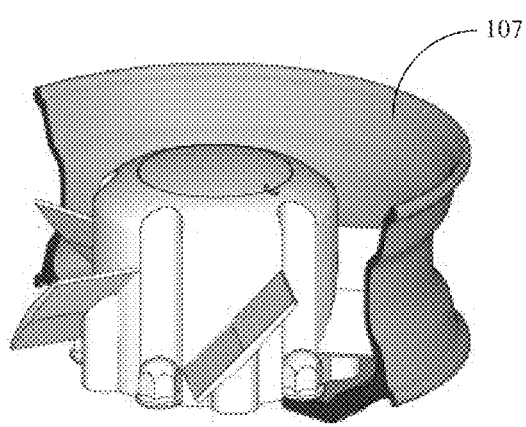
Fig. 6C

MODULATION OF A CONFIGURABLE WHEEL COVER

FIELD OF THE INVENTION

The present invention relates to a method for assembling or preparing a configurable wheel cover and relates to a product thereof.

DESCRIPTION OF PRIOR ART

In past years, the wheel cover or wheel rim were applied using many kinds of materials, such as steel, aluminum alloy, magnesium alloy, titanium alloy, composite material or polycast. In a general process, the rim was made by a spinning method, the wheel disk was made by a stamping method, and then the rim and the wheel disk were combined by an arc-welding method to form wheel rim.

Moreover, for the manufactured process of a wheel rim in a transportation vehicle field, the wheel rim of the truck or passenger train is made of an aluminum alloy, such as A356-T6, 2024-T4 or 6061-T6, and the manufacturing method is casting, forging or forming by an aluminum plate; however, the past methods must use specialized tools or skills to manufacture an all-in-one wheel rim. As mentioned above, a user can not choose a special style in accordance with his personal hobby or need.

Thus, the present invention provides a method for preparing or assembling a wheel cover in order to solve the above defects.

BRIEF DESCRIPTION OF THE DRAWINGS

The forgoing and other embodiments of the present invention are hereinafter discussed with reference to the drawing.

FIG. 1A-1C is schematic diagram illustrating components of a configurable wheel cover, in which FIG. 1A shows a configurable wheel cover, FIG. 1B shows a hub cover, and FIG. 1C shows an insert kit.

FIG. 2A shows a configurable wheel cover, FIG. 2B shows a hub cover; and FIG. 2C shows an insert kit.

FIG. 4A-4D is another embodiment that shows different shapes of the insert kit for assembling or preparing a configurable wheel cover.

FIG. 5A-5D is another embodiment that shows different shapes of the hub cover and the insert kit for assembling or preparing the configurable wheel cover.

FIG. 6A-6C is another embodiment that shows a BLADE configurable wheel cover. FIG. 6B is a top plan view thereof and FIG. 6C shows the BLADE configurable wheel cover mating into the wheel disk.

FIG. 7B is a top plan view thereof and FIG. 7C shows the BLENDER configurable wheel cover mating into the wheel disk.

FIG. 8B is a top plan view thereof and FIG. 8C shows the BUFF configurable wheel cover mating into the wheel disk.

FIG. 9B is a top plan view thereof and FIG. 9C shows the DROID configurable wheel cover mating into the wheel disk.

FIG. 10B is a top plan view thereof and FIG. 10C shows the NINJA configurable wheel cover mating into the wheel disk.

FIG. 11B is a top plan view thereof and FIG. 11C shows the VORTEX configurable wheel cover mating into the wheel disk.

FIG. 12B is a top plan view thereof and FIG. 12C shows the VELVET configurable wheel cover mating into the wheel disk.

SUMMARY OF THE INVENTION

Figure 1A:
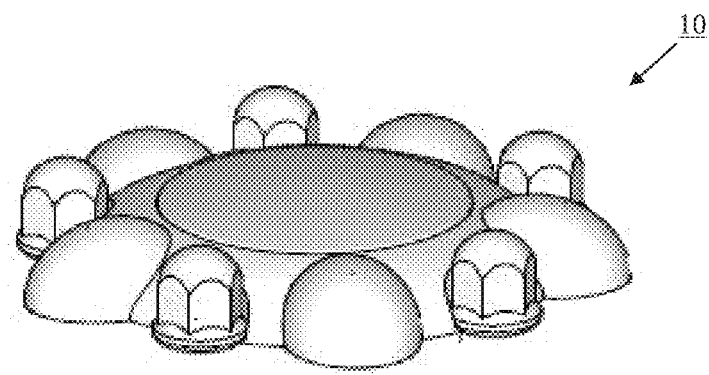

The present invention is a method for assembling or preparing a configurable wheel cover, comprising steps of: (a) providing a hub cover including a plurality of locking voids and a plurality of knobs; (b) providing an insert kit including a plurality of inserts, and a front end of each insert being connected with a tenon; and (c) configuring each tenon connected to the insert kit and engaging with a corresponding the locking void from a top or a bottom of the hub cover.

The present invention further provides a configurable wheel cover which comprises: (a) a hub cover including a plurality of locking voids and a plurality of knobs; and (b) an insert kit including a plurality of inserts, and a front end of each insert being connected with a tenon; wherein the plurality of inserts mate with the locking voids so as to partially or permanently secure the plurality of inserts to the hub cover.

DETAILED DESCRIPTION OF THE INVENTION

The present invention discloses an approach for modularizing a configurable wheel cover of a transportation vehicle, such us automobile, motorcycle, truck or any transportation vehicle. The configurable wheel cover of the present invention can be changed with different shapes of components according to personal hobby. On the other hand, the present invention can satisfy individual requirement to provide different material property of the wheel cover and/or any components, such as aluminum, steel, high strength low alloy steel (HSLA), dual-phase steels or bainitic steels, but not limited to the above materials.

The present invention provides a method for preparing or assembling a configurable wheel cover, comprising steps of: (a) providing a hub cover including a plurality of locking voids and a plurality of knobs; (b) providing an insert kit including a plurality of inserts, and a front end of each insert being connected with a tenon; and (c) configuring each tenon connected to the insert kit and engaging with a corresponding locking void from a top or a bottom of the hub cover.

In a certain embodiment, the step in the present invention further comprises configuring the configurable wheel cover to fit into a wheel disk. In the other embodiment, the method for installing the configurable wheel cover to fit into the wheel disk is via soldering, tenoning or magnetizing.

In a certain embodiment, the plurality of inserts mate with the plurality of locking voids so as to partially or permanently secure the plurality of inserts to the hub cover.

In a certain embodiment, the configurable wheel cover is used in a front-wheel or a rear-wheel of a transportation vehicle. In the preferred embodiment, the transportation vehicle is a light truck or heavy truck.

In a certain embodiment, each locking void is in a shape of circular arc, square, rectangular, ellipse or triangle, and each insert is a blade form, blender form, buff form, droid form, ninja form, vortex form or velvet form.

In a certain embodiment, each locking void and each knob are in a circular arrangement alternately surrounding a center portion of the hub cover.

The present invention further relates to a novel configurable wheel cover, comprising: (a) a hub cover including a plurality of locking voids and a plurality of knobs; and (b) an insert kit including a plurality of inserts, and a front end of each insert being connected with a tenon; wherein the plurality of inserts mate with the plurality of locking voids so as to partially or permanently secure the plurality of inserts to the hub cover.

In a certain embodiment, each tenon connected to the insert kit is configured and engaged with a corresponding the locking void from a top or a bottom of the hub cover.

In a certain embodiment, the configurable wheel cover further comprises a wheel disk which is configured to fit into the configurable wheel cover. In the preferred certain embodiment, installing the configurable wheel cover to fit into the wheel disk is via soldering, tenoning or magnetizing.

In a certain embodiment, the configurable wheel cover is used in a front-wheel or a rear-wheel of a transportation vehicle. In the preferred certain embodiment, the transportation vehicle is a light truck or heavy truck.

In a certain embodiment, each locking void is in a shape of circular arc, square, rectangular, ellipse or triangle, and each insert is a blade form, blender form, buff form, droid form, ninja form, vortex form or velvet form.

In a certain embodiment, each locking void and each knob are in a circular arrangement alternately surrounding a center portion of the hub cover.

A method of the present invention for preparing a configurable wheel cover and products thereof, and the products can be assembled with different kinds of add-on parts. By doing so, it makes production less costly on tooling design because the main part is the piece can be attached with different-styled parts. The size of the main part tooling is smaller and easier to be chrome-plated. The add-on parts are separated from the main parts which make them exchangeable and fungible. It is cheaper to develop small add-on parts for tooling is smaller in size and easier to maker. Also it is easier to get chrome plated successfully and less expensive. With the product be able to be attached with different add-on parts, it creates endless designs to market with much less cost.

In addition, changeable add-on parts can be finished with any paint color and/or hydrographic finish to coordinate with truck color and design.

The techniques, approaches and advantages of the present invention will become more apparent from the following detailed description when taken in conjunction with the accompanying drawings.

EXAMPLES

The examples below are non-limiting and are merely representative of various aspects and features of the present invention.

Figure 1B:
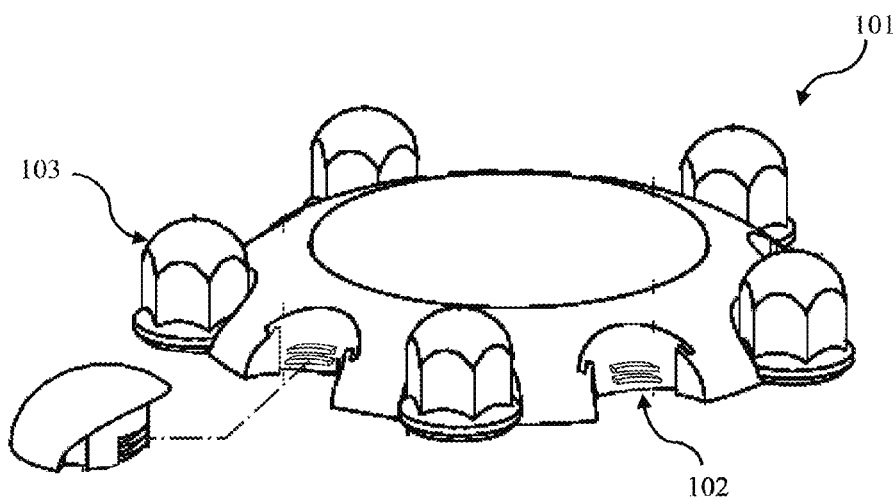
Figure 1C:
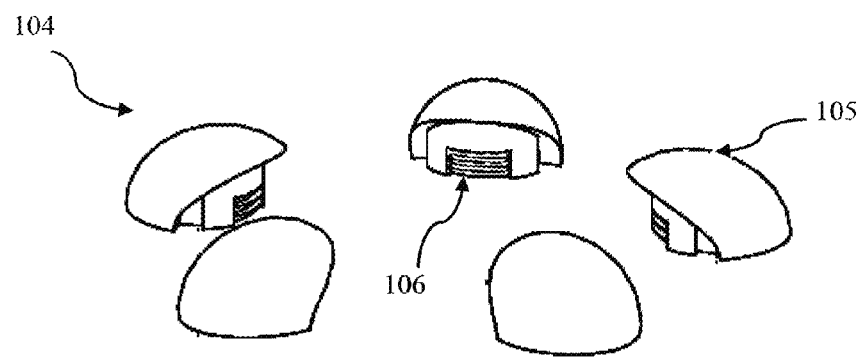
Figure 2A:
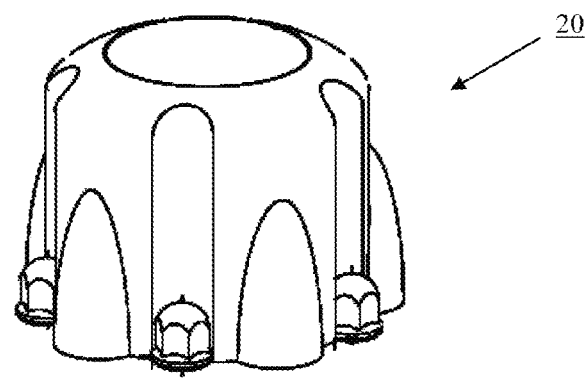
FIG. 2A-2C is another embodiment. The schematic diagram illustrates components of a configurable wheel cover.
Figure 2B:
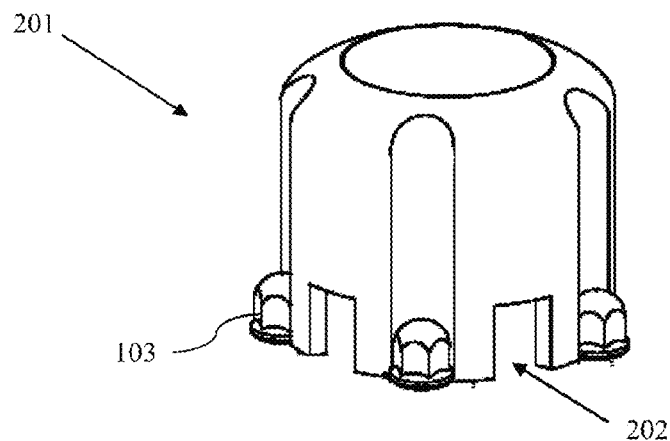
Figure 2C:
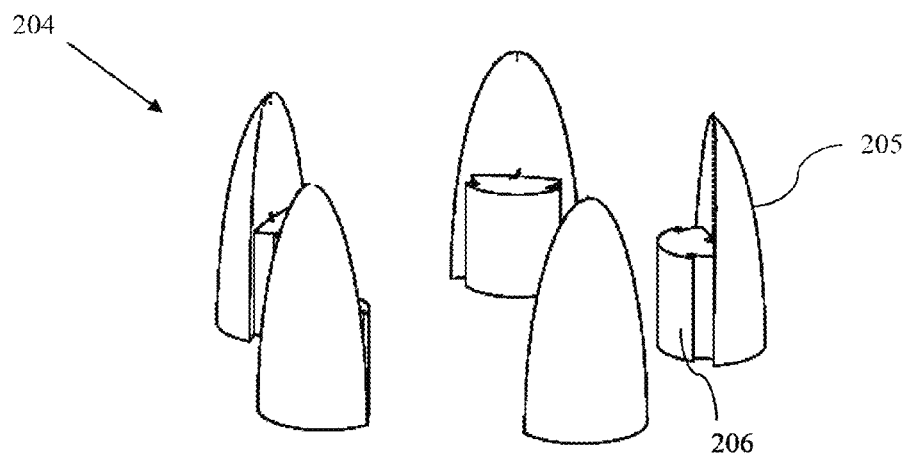

Referring to FIGS. 1 and 2, which respectively illustrated a configurable wheel cover (10 or 20) having a hub cover (101 or 201) including a plurality of locking voids (102 or 202) and a plurality of knobs 103, in which each locking void and each knob, or each tenon 106, are in a circular arrangement alternately surrounding a center portion of the hub cover; and an insert kit (104 or 204) including a plurality of inserts (105 or 205), a front end of each insert being connected with the tenon (106 or 206).

With further reference to FIGS. 1 and 2, the configurable wheel cover could be used for a standard front or rear wheel of a transportation vehicle, such as a light truck or heavy truck, but not limited to the above vehicle. In the present invention, the components of the configurable wheel cover (10 or 20), such as the hub cover and the insert kit, may be randomly varied in accordance with personal habit and aesthetic feeling.

Figures 3A, 3B:
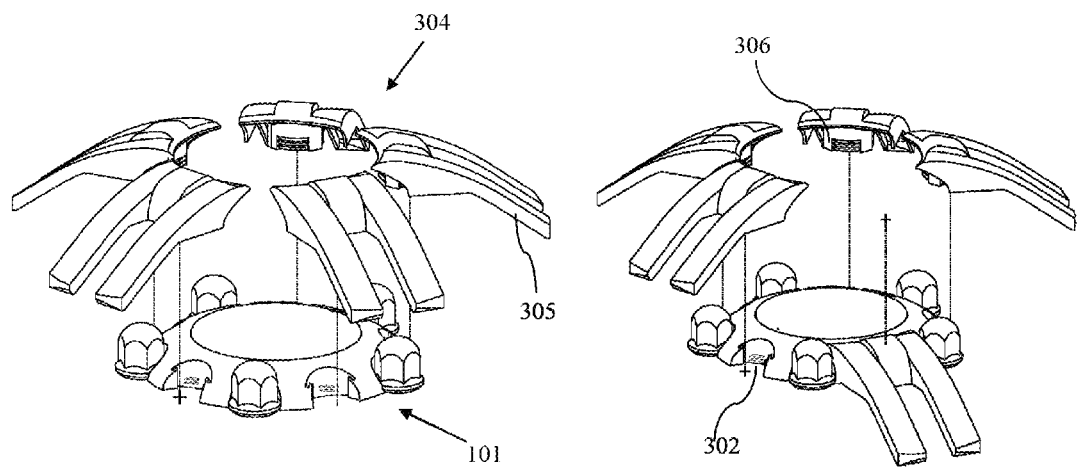
FIG. 3A-3D is a method for assembling or preparing a configurable wheel cover.
Figure 3C:
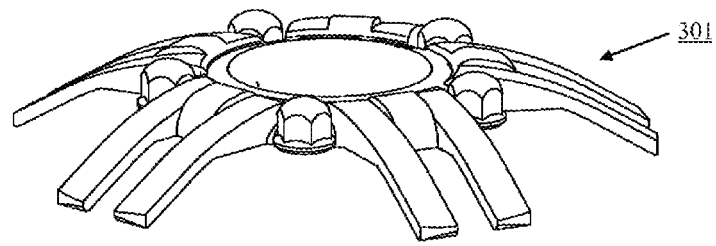
Figure 3D:
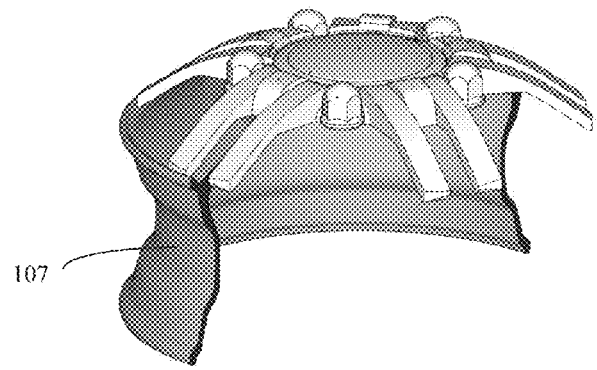

Referring to FIGS. 3 and 4, which respectively illustrated the modularizing process of a configurable wheel cover. Step 1: providing a hub cover 301 including a plurality of locking voids 101 and a plurality of knobs 103, in which each locking void and each knob, or each tenon 306 or 106, are in a circular arrangement alternately surrounding a center portion of the hub cover (FIG. 3A or FIG. 4A); step 2: providing an insert kit (304 or 104) including a plurality of inserts (305 or 105), a front end of each insert being connected with the tenon 306 or 106 (FIGS. 3A and 3B or FIGS. 4A and 4B); step 3: configuring each tenon connected to the insert kit and engaging with a corresponding locking void from a top of the hub cover (FIG. 3C or 4C); Step 4: configuring the configurable wheel cover to fit into a wheel disk (FIG. 3D or 4D). As described in the above steps, the present invention may provide an insert kit with a different shape for assembling with a wheel cover. In addition, steps 1 and 2 could be changed according to personal habit. In addition, there is no need to use a tool to engage the tenons with the locking voids.

With further reference to FIG. 5, which illustrated another embodiment that showing different shapes of a hub cover, including a plurality of locking voids 502 and a plurality of knobs 503, and an insert kit 504 for assembling or preparing a configurable wheel cover. In FIG. 5, each tenon 506 connected to the insert kit 504f including a plurality of inserts 505, is engaged with a corresponding locking void 502 from a bottom of hub cover 501, and the locking voids and insert kit with tenons could be varied for assembling or preparing the configurable wheel cover. In terms of the above preparation method, the unlimited variation of insert kits can be produced from small, inexpensive tooling.

Figure 7A:
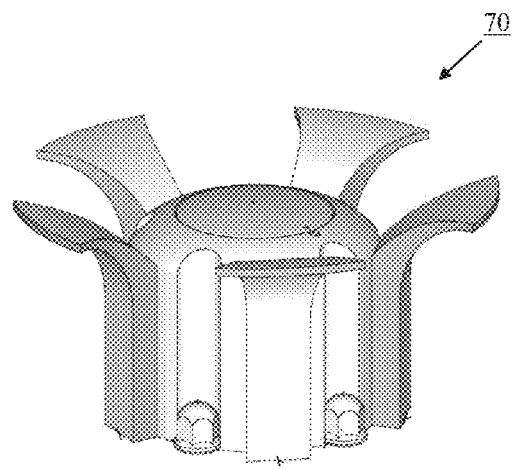
FIG. 7A-7C is another embodiment that shows a BLENDER configurable wheel cover.
Figure 7B:
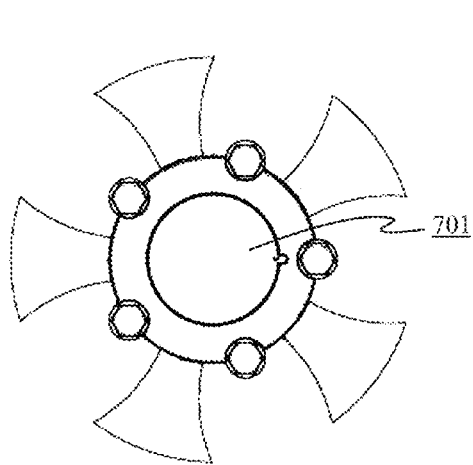
Figure 7C:
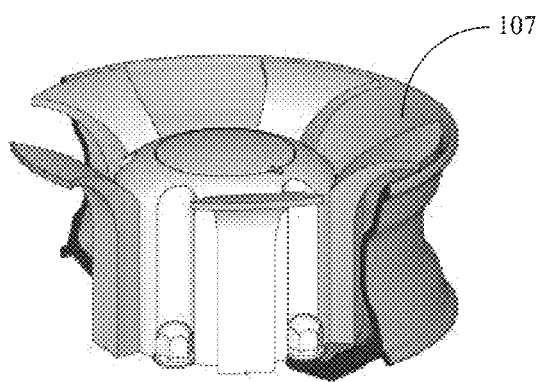
Figure 8A:
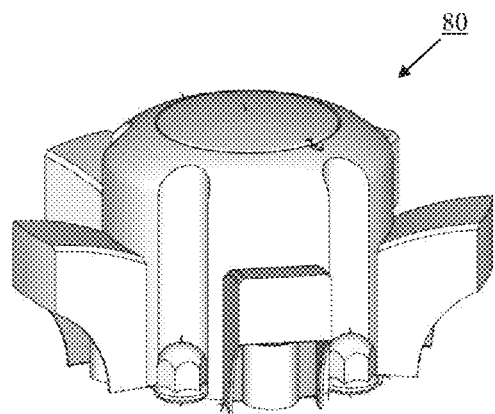
FIG. 8A-8C is another embodiment that shows a BUFF configurable wheel cover.
Figure 8B:
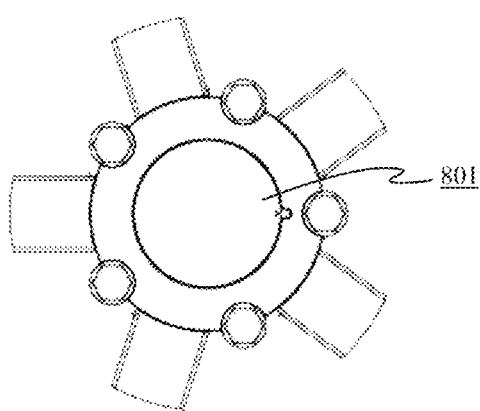
Figure 8C:
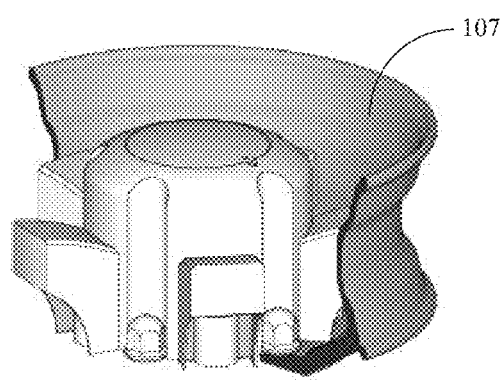
Figure 9A:
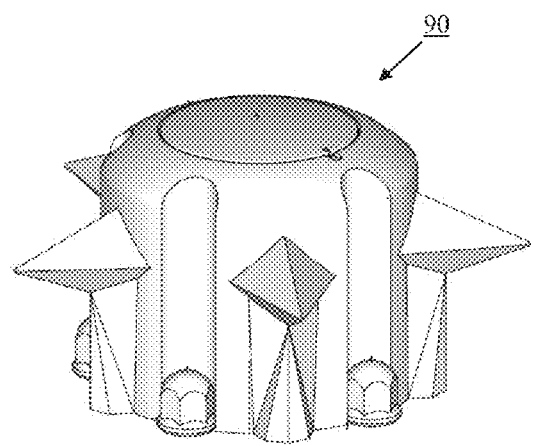
FIG. 9A-9C is another embodiment that shows a DROID configurable wheel cover.
Figure 9B:
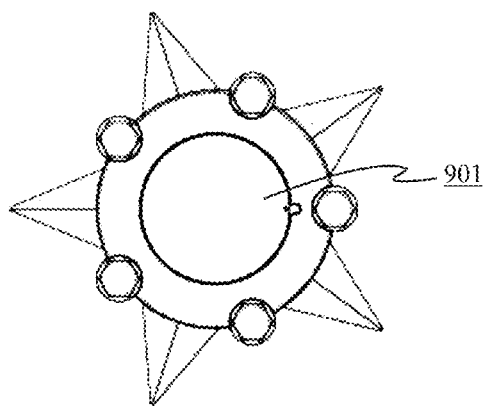
Figure 9C:
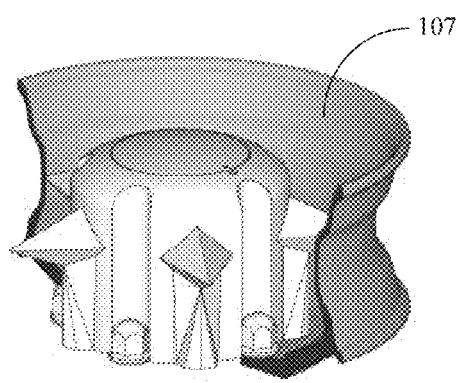
Figure 10A:
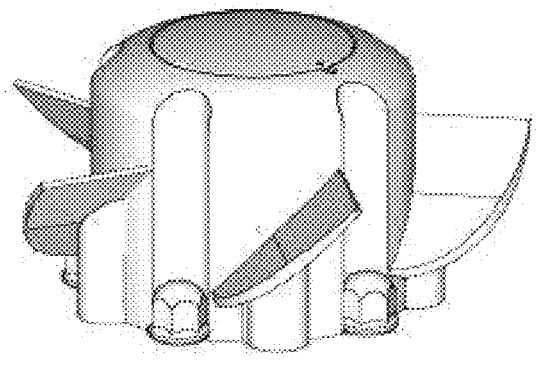
FIG. 10A-10C is another embodiment that shows a NINJA configurable wheel cover.
Figure 10B:
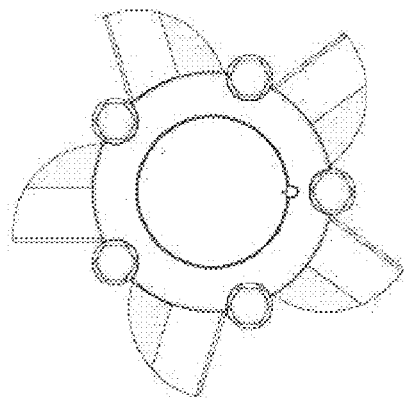
Figure 10C:
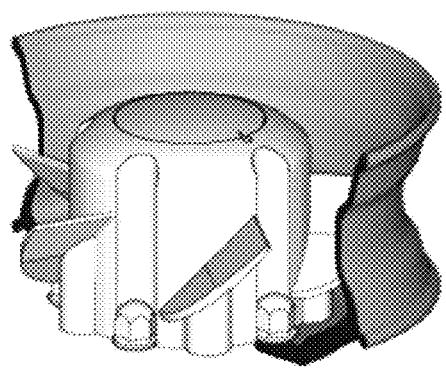
Figures 11A, 11B:
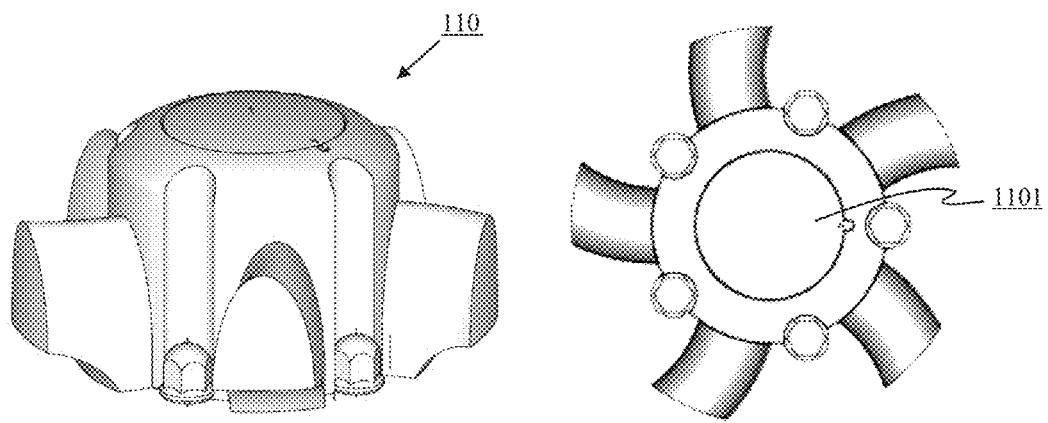
FIG. 11A-11C is another embodiment that shows a VORTEX configurable wheel cover.
Figure 11C:
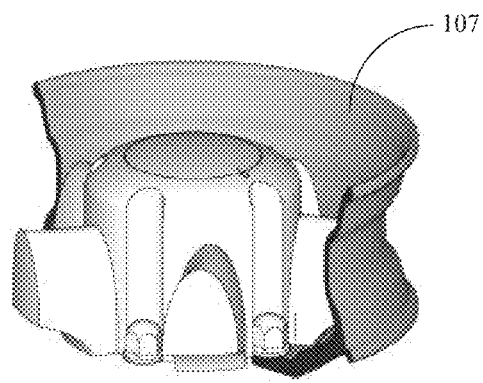
Figure 12A:
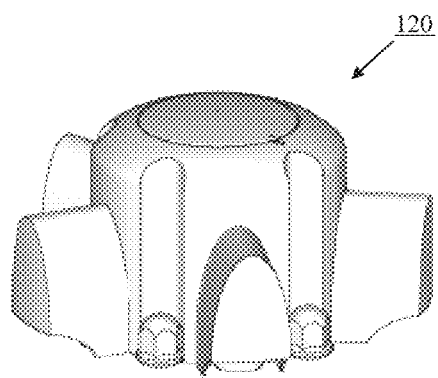
FIG. 12A-12C is another embodiment that shows a VELVET configurable wheel cover.
Figure 12B:
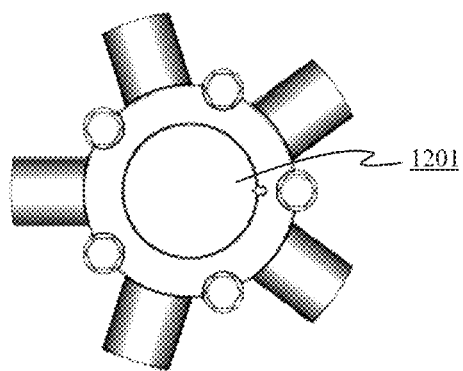
Figure 12C:
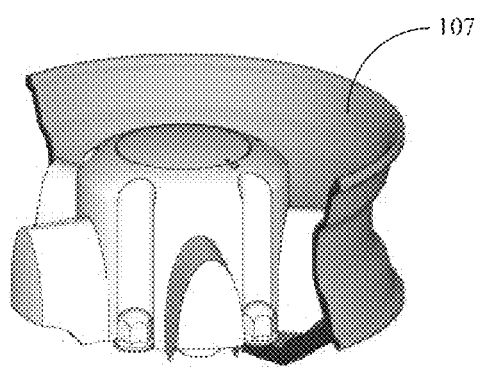

FIG. 6-FIG. 12 respectively showed a plurality of configurable wheel covers with different shapes that were configured via the above method. FIG. 6 was a BLADE configurable wheel cover; FIG. 7 was a BLENDER configurable wheel cover; FIG. 8 was a BUFF configurable wheel cover; FIG. 9 was a DROID configurable wheel cover; FIG. 10 was a NINJA configurable wheel cover; FIG. 11 was a VORTEX configurable wheel cover; and FIG. 12 was a VELVET configurable wheel cover.

In FIG. 1-12, reference numbers 10, 20, 301, 60, 70, 80, 90, 100, 110 and 120 refer to a wheel cover; reference numbers 101, 201, 301, 601, 701, 801, 901, 1001, 1101 and 1201 refer to a hub cover; and reference number 107 refers to a wheel rim.

While the invention has been described and exemplified in sufficient detail for those skilled in this art to make and use it, various alternatives, modifications, and improvements should be apparent without departing from the spirit and scope of the invention.

One skilled in the art readily appreciates that the present invention is well adapted to carry out the objects and obtain the ends and advantages mentioned, as well as those inherent therein. The processes and methods for producing them are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

What is claimed is:

1. A method of preparing a configurable wheel cover, comprising steps of:
   (a) providing a hub cover including a plurality of locking voids and a plurality of knobs;
   (b) providing an insert kit including a plurality of inserts, and a front end of each insert being connected with a tenon; and
   (c) configuring each tenon connected to the insert kit and engaging with a corresponding locking void from a top or a bottom of the hub cover, wherein the plurality of inserts mate with the plurality of locking voids so as to partially or permanently secure the plurality of inserts to the hub cover, and wherein each locking void and each tenon are in a circular arrangement alternately surrounding a center portion of the hub.

2. The method of claim 1, further comprising a step of configuring the configurable wheel cover to fit into a wheel disk.

3. The method of claim 1, wherein the configurable wheel cover is used in a front-wheel or a rear-wheel of a transportation vehicle.

4. The method of claim 3, wherein the transportation vehicle is a truck.

5. The method of claim 1, wherein each locking void is in a shape of circular arc, square, rectangular, ellipse or triangle.

6. The method of claim 1, wherein each insert is in a shape of a blade form, blender form, buff form, droid form, ninja form, vortex form or velvet form.

7. A configurable wheel cover, comprising:
   (a) a hub cover including a plurality of locking voids and a plurality of knobs; and
   (b) an insert kit including a plurality of inserts, and a front end of each insert being connected with a tenon,
   wherein the plurality of inserts mate with the plurality of locking voids so as to partially or permanently secure the plurality of inserts to the hub cover, wherein each tenon connected to the insert kit is configured and engaged with a corresponding locking void from a top or a bottom of the hub cover, and wherein each locking void and each tenon are in a circular arrangement alternately surrounding a center portion of the hub cover.

8. The configurable wheel cover of claim 7, wherein the configurable wheel cover is used in a front-wheel or a rear-wheel of a transportation vehicle.

9. The configurable wheel cover of claim 8, wherein the transportation vehicle is a light truck or heavy truck.

10. The configurable wheel cover of claim 7, wherein each locking void is in a shape of circular arc, square, rectangular, ellipse or triangle.

11. The configurable wheel cover of claim 7, wherein each insert is a blade form, blender form, buff form, droid form, ninja form, vortex form or velvet form.

* * * * *